United States Patent [19]

Lauro et al.

[11] Patent Number: 5,173,709
[45] Date of Patent: Dec. 22, 1992

[54] ELECTRONIC DIRECTION FINDER

[75] Inventors: George L. Lauro; Ralph E. Menick, both of Lake Zurich, Ill.

[73] Assignee: Motorola, Inc., Schaumburg, Ill.

[21] Appl. No.: 710,197

[22] Filed: Jun. 3, 1991

[51] Int. Cl.⁵ .................. G01S 5/04; G01C 9/00; G01C 21/00
[52] U.S. Cl. .................. 342/443; 342/419; 33/349; 364/444
[58] Field of Search .......... 342/357, 443, 419; 364/444, 449; 340/988, 985, 944, 870.15; 33/319, 320, 324, 349

[56] References Cited

U.S. PATENT DOCUMENTS

| | | | |
|---|---|---|---|
| Re. 33,025 | 8/1989 | Matsumoto et al. | 364/444 |
| 3,115,635 | 12/1963 | Leeming, Jr. et al. | 342/419 |
| 3,400,364 | 9/1968 | Musgrave et al. | 340/995 |
| 3,469,262 | 9/1969 | Frieling | 342/419 |
| 4,024,382 | 5/1977 | Fowler | 364/449 |
| 4,225,867 | 9/1980 | Gell | 342/417 |
| 4,454,583 | 6/1984 | Schneiderhan et al. | 364/449 |
| 4,763,268 | 8/1988 | Itoh et al. | 364/449 |
| 4,768,153 | 8/1988 | Akamatsu | 364/449 |
| 4,814,989 | 3/1989 | Döbereiner et al. | 340/988 |
| 4,899,285 | 2/1990 | Nakayama et al. | 364/453 |
| 4,949,089 | 8/1990 | Ruszkowski, Jr. | 342/52 |

FOREIGN PATENT DOCUMENTS

| | | | |
|---|---|---|---|
| 0138114 | 6/1986 | Japan | 340/988 |
| 0196179 | 8/1986 | Japan | 342/357 |
| 2142143 | 1/1985 | United Kingdom | 340/988 |

Primary Examiner—Gregory C. Issing
Attorney, Agent, or Firm—John H. Moore

[57] ABSTRACT

An electronic direction finder (10) includes a navigation receiver (28) and a compass (32) to generate a bearing signal that indicates that direction of a desired destination. The bearing signal is received by a display driver (34) which causes an electronic display (14) to generate a visible image of a rotatable pointer that points in the direction of the user's desired destination. Preferably, the display also shows an electronic compass card indicating the direction of north.

4 Claims, 3 Drawing Sheets

ELECTRONIC DIRECTION FINDER

FIELD OF THE INVENTION

This invention is directed generally to the field of electronic direction finders which provide a user with information as to the distance and bearing from the user's present position to a desired destination.

BACKGROUND OF THE INVENTION

Conventional navigation instruments, such as GPS (Global Positioning System) receivers, Loran receivers, and the like can provide a user with the latitude and longitude of the user's present position. If the latitude and longitude of a desired destination (sometimes referred to as a "waypoint") is input to the navigation instrument, the instrument can readily calculate the distance and bearing to the destination.

Conventionally, the bearing to the destination is displayed to the user in a digital format in degrees relative to true north. Thus, a conventional display might indicate that the bearing to a desired destination is 225°. To those users who are familiar with compass terminology and/or navigational charts, the bearing of 225° clearly means that the desired destination lies southwest of the user.

A problem with this approach arises when the user is not familiar with such traditional compass headings, or with the use of compasses generally, and, therefore, is unsure of which direction in which to turn in order to be properly headed toward the desired destination. Moreover, even those who are familiar with traditional compass terminology may not be able to readily turn toward the desired destination unless they also reliably know the direction of north.

BRIEF DESCRIPTION OF THE FIGS.

DESCRIPTION OF THE PREFERRED EMBODIMENT

Figure 1:
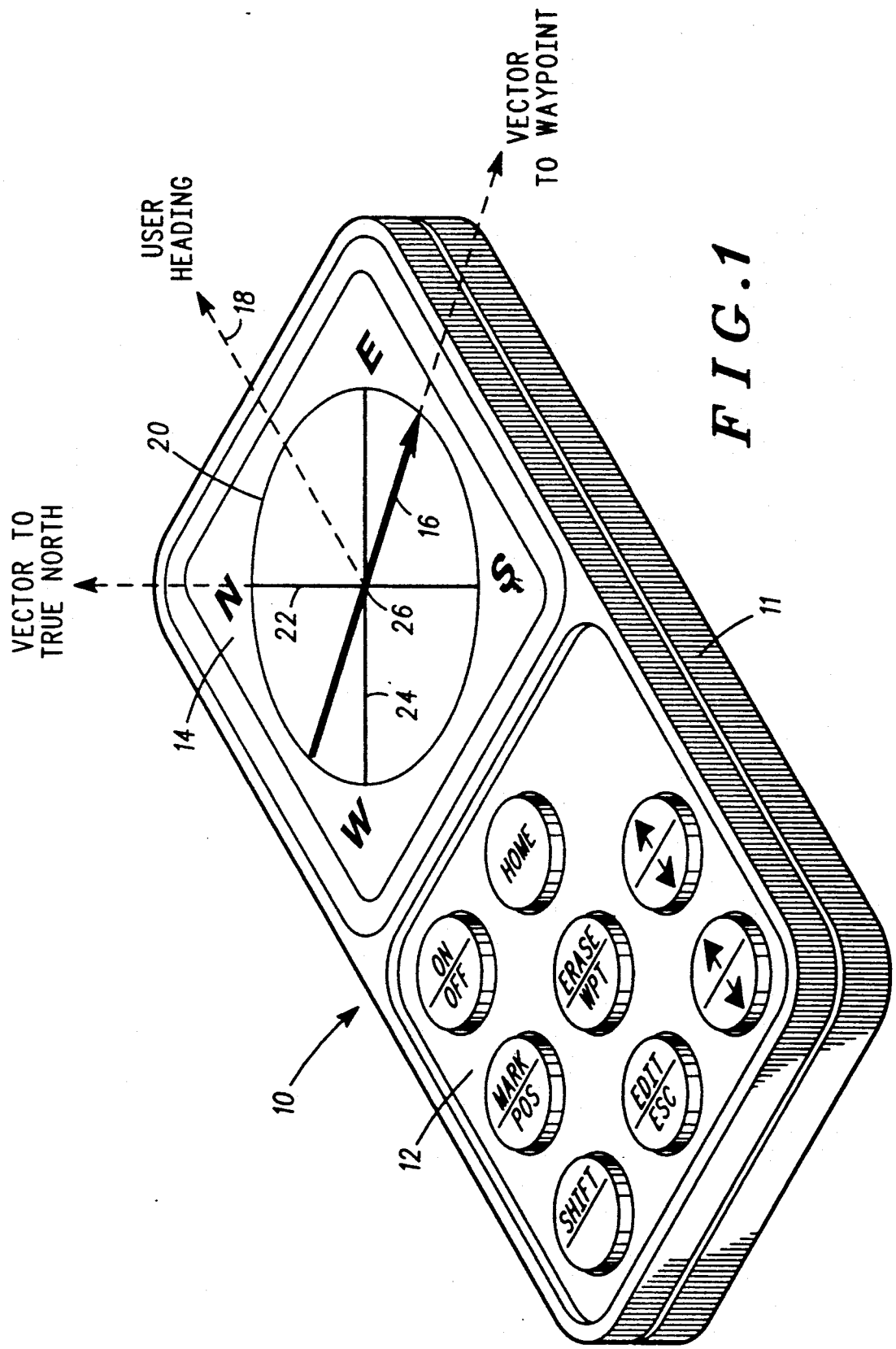
FIG. 1 shows a portable direction finder constructed according to the invention.

Referring to FIG. 1, a portable direction finder 10 is shown whose housing 11 contains a keypad 12 and a display 14. The keypad 12 allows a user to input data regarding the latitude and longitude of the user's present position, and the latitude and longitude of waypoints (also referred to herein as "desired destinations"); the keypad may also permit the user to command the direction finder to point in the direction of a specific desired destination that is commonly referred to as "home". Other functions that are not pertinent to this invention may also be actuated by the keypad.

Inside the direction finder 10 is a navigation receiver, a compass and other circuits (discussed more fully below) that enable the direction finder to point the user toward "home" or toward another desired destination.

Referring now to the display 14, one of its most significant features is that it generates an image of a pointer 16 (preferably in the form of the illustrated arrow) that points toward the desired destination selected by the user, irrespective of the user's heading. Herein, the user's heading is considered as parallel to the major axis 18 of the direction finder. Thus, with the user facing in the direction of the axis 18, the pointer 16 clearly indicates that the user should turn to his right approximately 75° in order to be headed directly toward the desired destination. As the user turns in that direction, the head of the pointer 16 automatically moves in a counterclockwise direction. When the user is facing directly toward the desired destination, the pointer 16 will point directly along the axis 18. An advantage of this "pointing" system is that the user does not need to be familiar with compass or navigation terminology to determine the direct route toward the desired destination.

The pointer 16 may be the only image generated by the display 14. Preferably, however, the display also generates an image of a compass card which indicates at least one compass point, such as north. In the illustrated embodiment, the compass card includes a circle 20, the compass points N, S, E and W, and a pair of line segments 22, 24 connecting N to S and E to W, respectively. In response to the compass and other circuitry within the direction finder 10, the image of the compass card rotates around its center 26 so that the compass point N and the line segment 22 line up with north, preferably true north. This arrangement provides the user not only with the easy-to-read pointer 16, but also with a compass to provide additional navigational information. And because the pointer 16 is overlayed on the image of the compass card, and rotates around the card's center 26, the compass heading of the desired destination can be read directly from the display.

It should be noted that the complexity of the compass card may be modified to provide the desired degree of resolution. For example, if only approximate compass readings are needed, then the compass card image may include only the four illustrated compass points, or it may include only the compass point N, while including the line segments 22 and 24 to indicate the other three primary compass directions. If greater resolution is desired, intermediate compass points may be added because the electronic circuity which provides the compass information is capable of high resolution.

As an option, the images of the compass card and the pointer may be selectively erased from the display at the user's election, and replaced by numerical information indicating the user's present latitude and longitude, the range and bearing of the desired destination, etc. The same numerical information could also be displayed in a portion of the display 14 that is not occupied by images of the compass card and pointer.

Figure 2:
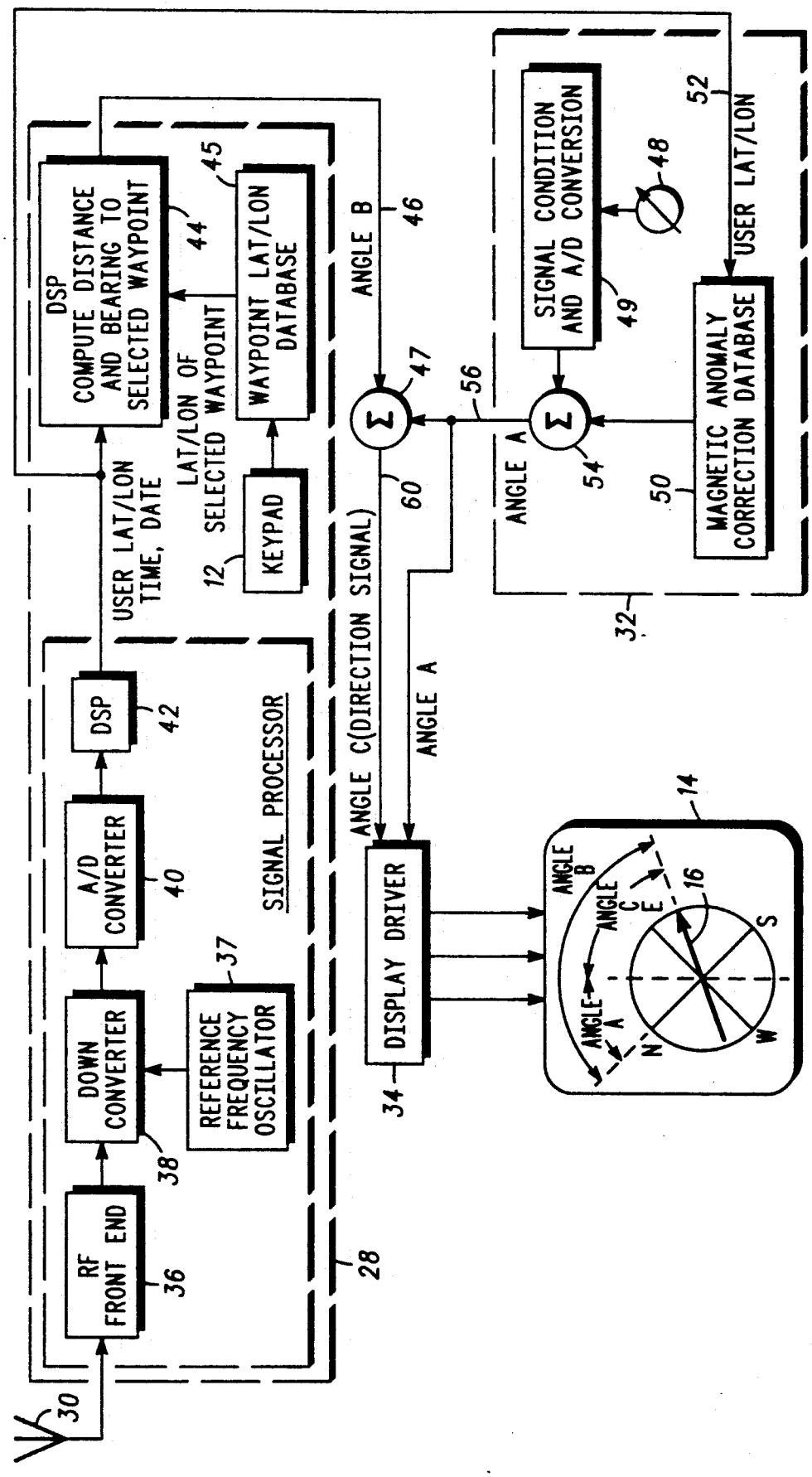
FIG. 2 is a schematic block diagram illustrating the internal construction of the direction finder shown in FIG. 1.
Figure 4:
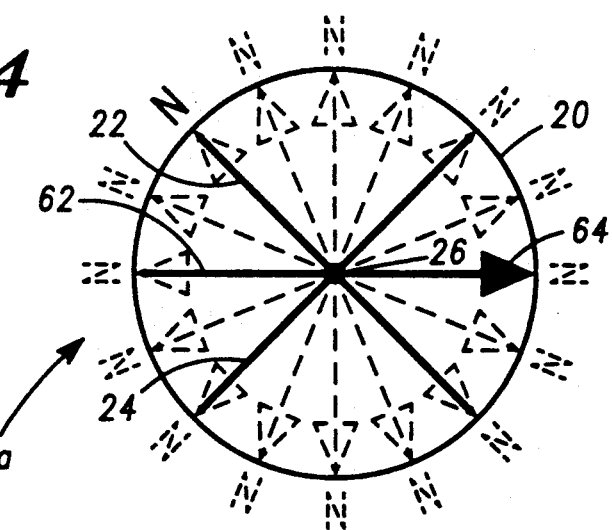
FIG. 4 is an enlarged view of the display shown in FIG. 3.

The electronic circuitry which provides the information for effecting the functions of the compass card and the pointer will now be described with reference to FIG. 2. As shown, the major components of the direction finder are the display 14, a navigation receiver 28 coupled to a receiving antenna 30, a compass 321 and a display driver 34. Generally speaking, the navigation receiver 28 and the compass 32 generate signals that are combined so as to generate a "direction signal". This direction signal is indicative of a bearing toward a desired destination of the user, and the bearing is relative to the user's heading. The "direction signal" is applied to the display driver 34 which causes the display 14 to generate the image of the rotatable pointer 16 and to cause the pointer to point in the direction of the desired destination.

Referring now to the navigation receiver 28, it is preferably a GPS receiver which may be of conventional construction. Alternately, a loran receiver or other form of navigation receiver may be used.

The preferred GPS receiver has a signal processing section that includes an RF front end 36 driving a down converter 38, the latter also receiving a reference frequency signal from an oscillator 37. The output from the down converter 38 is applied to an A/D (analog-to-digital) converter 40 and thence to a DSP (digital signal processor) 42 to provide an output signal indicative of the user's latitude and longitude. The time and date are also customarily generated as a part of the output from the DSP 42, but they are not significant to the present invention.

Another conventional DSP 44 receives two inputs, one from the DSP 42 and a second input from a database 45 that contains the latitudes and longitudes of various waypoints, as input by the user via the keypad 12. Operating conventionally, the DSP 44 uses those inputs to compute the distance and bearing to the waypoint selected by the user. The computed bearing to the waypoint, indicated on lead 46 as Angle B, is also shown on display 14 in FIG. 2. Thus, Angle B represents the bearing angle (relative to north) from the user's present location to the location of the selected waypoint. Angle B is not used directly to drive the pointer. Instead, it is applied as one input to a conventional combining circuit 47, the other input to which is developed by the compass 32 as will now be described.

Preferably, the compass 32 is a flux gate compass whose components may all be conventional. The illustrated compass includes a conventional flux gate mechanism 48 whose output may be applied to a conventional signal conditioning and A/D (analog-to-digital) conversion circuit 49. The output of the circuit 49 is a signal that represents the user's heading relative to magnetic north. If it is desired to convert the user's heading to a "true" bearing, a database (i.e., look-up table) 50 may be included. This database contains information which identifies the amount of magnetic variation which exists at various geographic locations. Accordingly, in response to the information identifying the user's latitude and longitude (on lead 52), the database can output a signal representing the amount of correction needed at that location to convert the "relative" signal from circuit 49 to a "true" signal. That correcting signal is applied to a conventional summer 54 which also receives the output from the circuit 49. The result of such summing is the generation of a signal (identified as Angle A) on lead 56 that represents the heading of the user with respect to true north.

To develop a signal which represents the direction of the desired destination relative to the user's heading, Angle A on lead 56 is combined with Angle B on lead 46 in the combining circuit 47 such that Angle A is subtracted from Angle B to produce Angle C on lead 60. The signal representing Angle C is the "direction signal" that causes the pointer 16 to point in the direction of the user's desired destination, irrespective of the user's heading.

Referring now to the display driver 34, it includes conventional circuitry for driving the display 14 and logic circuitry (such as a microprocessor) for using the signals representing Angles A and C to activate the appropriate portions of the display.

The display 14 may be a conventional liquid crystal display. The specific construction of this type of display, and the construction of the display driver 34, is discussed immediately below with reference to FIG. 3.

Figure 3:
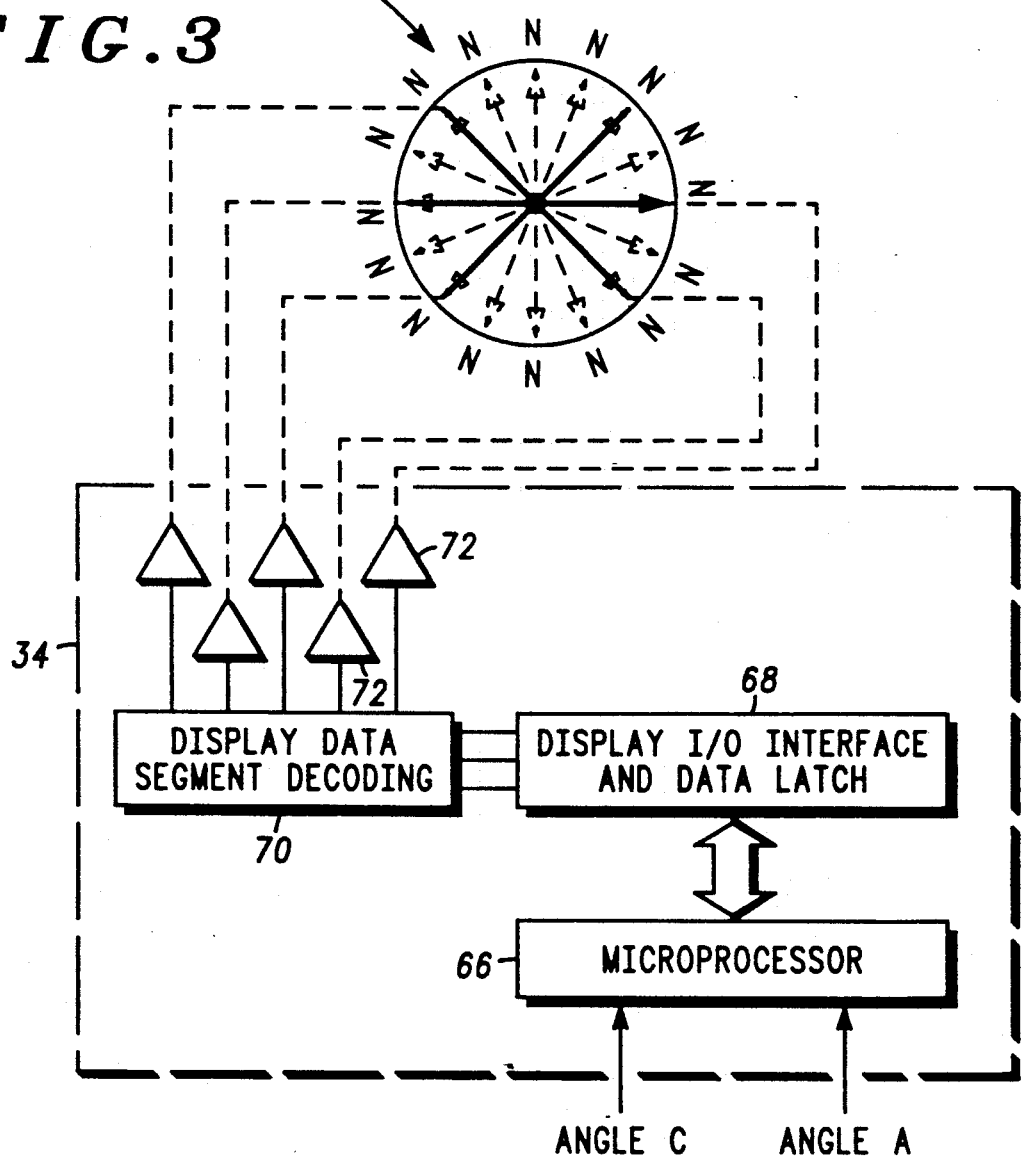
FIG. 3 shows more detail of the display finder shown in FIG. 2, plus details of a modified display.

In FIG. 3, a display 14a represents a slightly different form of the display 14. Specifically, the display 14a generates an image of a compass card that includes only the letter "N" (north), plus line segments 22, 24 and circle 20. The letters "W", "E" and "S" are omitted from the display 14a, but their omission does not materially affect the ease of using the direction finder.

As shown, the display 14a is a liquid crystal display that is configured to activate selected ones of a plurality of line segments. Each line segment extends from one edge of the circle 20, through the center of the circle 20, to the opposite edge of the circle. For example, the line segment 22 extends from the activated letter N, through the center of the circle 20, to the opposite end of the circle. This opposite end of the segment 22 points toward south in this figure.

There are L individual, equally spaced, line segments, where L equals 8 in the illustrated embodiment. L may be made larger if greater resolution is desired.

At any given time, up to three of the line segments may be activated. One of the activated line segments (e.g. segment 22) indicates the north-south direction, another activated line segment (e.g., segment 24) indicates the east-west direction, and the third activated line segment 62 forms part of the pointer. In FIG. 3, all these activated line segments are shown as solid black lines. The unactivated line segments are shown as dashed lines.

The display is also configured to include 2L (i.e. 16 in this embodiment) N'S located around the perimeter of the circle 20, each situated at an end of a line segment. The "N" which designates north and which is associated with the line segment 22 is shown as the only activated "N".

There are also 2L arrowheads (such as arrowhead 64), each of which is situated at one end of a line segment at the inner periphery of the circle 20. There will only be one arrowhead activated at any given time (shown by solid black), namely, the arrowhead associated with the activated line segment that forms part of the pointer. Thus, a pointer is displayed when an arrowhead, such as arrowhead 64, and its associated line segment (e.g., line segment 62) are simultaneously activated.

The process of selecting which display segments to activate in a particular situation can be broken into two parts: (1) selecting the correct segments to display compass information; and (2) selecting the correct segments to form a pointer that points in the direction of the desired destination.

To select the proper display segments for the compass information, a microprocessor 66 (such as a 68HC11 microprocessor made by Motorola, Inc.) is included. This microprocessor receives the information representing Angle A and Angle C and determines, from that information, which display segments to activate. To select the proper "N" to activate, the microprocessor computes the value of $[(360-A)\times 2L+360]$, where A is the value of Angle A supplied to the microprocessor and L is the number of line segments. Having computed that value, the result is rounded to the nearest integer I. That integer (whose value can vary from 0 to 15) indicates which "N" to activate. The line segment that terminates at the selected "N" is also activated.

This provides an illuminated "N" plus an illuminated north-south line. To select the proposed line segment for an east-west line, the microprocessor subtracts the value of L/2 from the previously calculated integer I if the integer I is greater than or equal to L/2. Otherwise, L/2 is added to the value of the integer I. The result identifies the line segment (e.g., line segment 24) to be activated for representing the east-west direction.

The appropriate arrowhead for the pointer is determined by the microprocessor by finding the value of (C×2L+360), where C is the value of Angle C. The result (which can vary from 0-15) is rounded to the nearest integer which identifies the arrowhead to activate. The microprocessor also selects for activation the line segment that terminates at the selected arrowhead to form a pointer.

The information thus calculated by the microprocessor 66 is fed to a display I/O interface and data latch 68. The device 68 is a conventional circuit that stores binary coded data received from the microprocessor 66. Another conventional circuit, a display data segment decoder 70, receives the binary code stored in the data latch 68 and converts it to signals that drive the correct display segment. These signals activate conventional segment drivers 72 so as to activate the display segments chosen by the microprocessor 66.

Various modifications to the illustrated structure are possible. For example, the microprocessor 66 can be adapted to effect the functions of the combining circuits 47 and 54 (FIG. 2). Further, the microprocessor 66 could even be included as a part of the DSP 44 rather than being a separate component. Various other such modifications will be obvious to those skilled in the art.

It can be seen, therefore, that an easy-to-use direction finder has been provided which allows a user to quickly determine the direct route to a desired destination. No familiarity with navigation terminology is required. By merely following the direction of the pointer, the user is able to proceed toward the desired destination. Even if the terrain requires detours from the most direct route, the pointer will automatically compensate to continuously point the user back toward his destination.

What is claimed is:

1. A portable electronic direction finder for directing a user toward a user selectable destination, comprising:
   means including a navigation receiver and a compass for generating a direction signal indicative of a bearing toward the destination, the bearing being relative to the user's heading;
   an electronic display; and
   a display driver coupled to the electronic display and responsive to the direction signal and to the compass for causing the electronic display to generate a pair of simultaneous visible images, one image being a compass card illustrating at least one actual compass direction, and the other image being a linear rotatable pointer which points in the direction of the user selectable destination relative to the user's heading.

2. An electronic direction finder as set forth in claim 1 wherein the compass card has a center, and wherein the pointer image rotates about an axis that is substantially aligned with the center of the compass card.

3. A portable electronic direction finder, comprising:
   input means permitting a user to input data indicative of a desired destination;
   a GPS receiver which responds to the input data for generating a bearing signal indicative of a bearing relative to north (Angle B) from the user's present position to the desired destination;
   a compass for generating a heading signal indicative of the user's heading (Angle A) relative to north;
   means receiving the bearing signal and the heading signal for generating therefrom a direction signal indicative of the direction, relative to the user's heading, of the desired destination; and
   means including a display, responsive to the direction signal and to the heading signal, for simultaneously generating two images, one image being an image of a linear pointer which points in the direction of the desired destination relative to the user's heading, and the other image being a compass card that illustrates actual compass directions.

4. An electronic direction finder, comprising:
   input means permitting a user to input data indicative of a desired destination;
   a GPS receiver which responds to the input data for generating a bearing signal indicative of a bearing relative to north from the user's present position to the desired destination;
   a flux-gate compass for generating a heading signal indicative of the user's heading relative to north;
   means receiving the bearing signal and the heading signal for generating therefrom a direction signal indicative of the direction, relative to the user's heading, of the desired destination;
   an electronic display; and
   a display driver coupled to the electronic display and responsive to the heading signal for causing the electronic display to generate a visible image of a compass card having a center and illustrating actual compass directions, and responsive to the direction signal for causing the electronic display to generate a simultaneous visible image of an arrow that is rotatable about an axis that is substantially aligned with the center of the compass card, and for causing the arrow to point in the direction of the desired destination relative to the user's heading, irrespective of changes in the user's heading.

* * * * *